United States Patent
Kathan et al.

(10) Patent No.: US 6,831,465 B2
(45) Date of Patent: Dec. 14, 2004

(54) ELECTRICAL MEASUREMENT MEANS

(75) Inventors: Benno Kathan, Wasserburg (DE); Alfred Wagner, Bodnegg (DE)

(73) Assignee: i f m electronic GmbH, Essen (DE)

( * ) Notice: Subject to any disclaimer, the term of this patent is extended or adjusted under 35 U.S.C. 154(b) by 226 days.

(21) Appl. No.: 10/200,592

(22) Filed: Jul. 23, 2002

(65) Prior Publication Data
US 2004/0012394 A1 Jan. 22, 2004

(30) Foreign Application Priority Data

Jul. 23, 2001 (DE) .......................... 101 34 954
Jan. 27, 2002 (DE) .......................... 102 03 203

(51) Int. Cl.[7] .............................. G01N 27/02
(52) U.S. Cl. ............. 324/444; 324/464; 324/438; 324/459; 73/1.02; 73/31.04
(58) Field of Search ............. 250/214.1, 214 R; 324/460, 464, 459, 461–462, 465–470; 73/1.02, 31.04, 862.624

(56) References Cited

U.S. PATENT DOCUMENTS

| | | | | |
|---|---|---|---|---|
| 4,466,295 A | * | 8/1984 | Wesson ................ | 73/862.624 |
| 4,955,727 A | * | 9/1990 | Weiss ................... | 374/124 |
| 5,955,859 A | | 9/1999 | Baurand et al. ...... | 318/672 |
| 6,333,632 B1 | * | 12/2001 | Yang et al. ........... | 324/464 |

FOREIGN PATENT DOCUMENTS

| | | |
|---|---|---|
| DE | G 91 05 121.5 U1 | 8/1991 |
| DE | 196 29 868 A1 | 2/1998 |
| DE | 200 18 871 U1 | 2/2001 |
| DE | 100 22 013 A1 | 6/2001 |
| WO | WO 00/77476 A1 | 12/2000 |

OTHER PUBLICATIONS

Universal Sensor Interface Chip (USIC): Specification and Applications Outline, P.D. Wilson et al., Sensor Review, vol. 16, No. 1, 1996, pp. 18–21, no month available.
MLX 90308, Programmierbares Sensor–Interface, Applikator, Elektor, 11/98, pp. 72–75.

* cited by examiner

Primary Examiner—Vincent Q. Nguyen
(74) Attorney, Agent, or Firm—Nixon Peabody LLP; David S. Safran

(57) ABSTRACT

An electrical measurement device is described, with a measurement input, an integrated sensor, a measurement and evaluation circuit, and a measured value display, and several measured value outputs. The electrical measurement device enables not only one measured value or several measured values to be determined, but makes it possible to display and process the determined measured values depending on other values such as comparison values and setpoints. An influencing input acts on the measurement and evaluation circuit and is the connecting point for the electrical measurement device to which or via which an influencing value can be applied or input. Therefore, a value with which the measured value can be influenced in the broadest sense is applied.

15 Claims, 1 Drawing Sheet

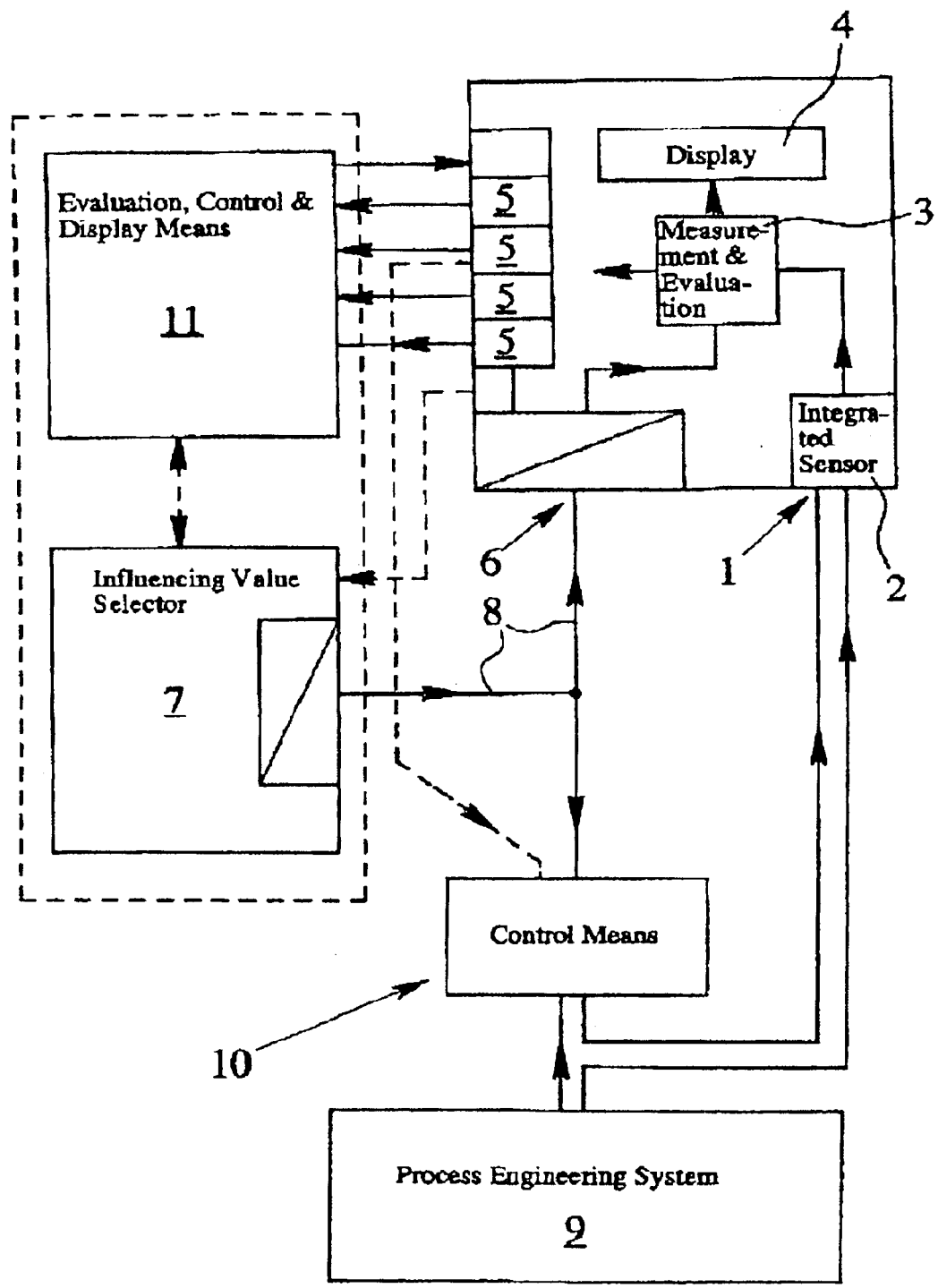

ELECTRICAL MEASUREMENT MEANS

BACKGROUND OF THE INVENTION

1. Field of Invention

The invention relates to an electrical measurement means, with at least one measurement input, at least one preferably integrated sensor, a measurement and evaluation circuit, at least one measured value display, and at least one measured value output.

2. Description of Related Art

The electrical measurement means according to the invention can be used to measure and process physical quantities (for example, pressures), temperatures, chemical quantities (for example, pH values), and electrical quantities (for example, voltages, currents, wattages and frequencies). One primary such electrical measurement mean is described below. It is used to measure and process pressures.

Electrical measurement means of the type under consideration can consist of several components, or can be made as a single-component measurement device. For the teaching of the invention, it is irrelevant whether the electrical measurement means in question consists of several components or is made as a single-component measurement device. An electrical measurement means is described below which consists of several components. Likewise, this measurement means can also be made as a single-component measurement device, wherein all components can be combined physically and spatially in one measurement device.

At this point, the initially used concepts "measurement input," "sensor," "measurement and evaluation circuit," "measured value display," and "measured value output" will be explained.

"Measurement input" means the location of the measurement means (or the measurement device) at which or via which the quantity to be measured, hereinafter always called the measured quantity, is supplied to the measurement means (or the measurement device). A "sensor" means a component which generate an intermediate value from a measured quantity. The intermediate value is generally proportional to the measured quantity. If the measured quantity is a pressure, the sensor can generate an electrical voltage, for example, as the intermediate value. Alternatively, the sensor can also generate an electrical current, a resistance value, a capacitance value, or an inductance value as the intermediate value.

It was stated initially that the electrical measurement means according to the invention includes at least one sensor which is preferably integrated. It should be noted that when the electrical measurement means according to the invention includes several sensors, one sensor can be a separate component, but all sensors can also be separate components. When the measurement means of the invention includes several sensors, one sensor can also be integrated, but all sensors can also always be integrated.

The "measurement and evaluation circuit" which is included in the electrical measurement means in accordance with the invention is used to convert either the intermediate value generated by the sensor directly into a measured value, or to make available the measured value after processing the intermediate value as a measured value.

The measured value made available by the measurement and evaluation circuit can be displayed by the "measured value display" in analog or digital format and can be made available at the "measured value output." Generally, the measurement and evaluation circuit generates the measured value derived from the intermediate value in "electrical form," for example, as a voltage proportional to the measured value between 0 V and 10 V. It may also be generated from a current proportional to the measured value between 4 mA and 20 mA or between 0 mA and 20 mA. If the measurement and evaluation circuit generates a voltage proportional to the measured value or a current proportional to the measured value, the measured value display is working in an analog form and there is an analog measured value. But the measurement and evaluation circuit can also generate the measured value which corresponds to the intermediate value in digital form. Additionally, it is also possible to work with a measurement and evaluation circuit which makes available both a measured value which corresponds to the intermediate value in analog form and also a measured value which corresponds to the intermediate value in digital form.

It is often necessary to "use" the measured value that is determined with an electrical measurement means of the type under consideration in mechanical device or means or in a process engineering system. When used in this fashion, the measured value is often dependent upon other values, such as comparison values or set points. Examples include difference pressure measurement, in which two certain measured values which represent pressure or two pressure-proportional measured values are needed, or a control means in which a quantity or measured value representing the present state is compared to a reference variable. To accomplish this in the prior art, relatively complex solutions were employed partially relying on a mechanical or physical basis, and partially relying on an electrical basis.

To overcome the problems in the prior art, the object of the invention is to make available an electrical measurement means with which not only one measured value or several measured values can be determined, but which makes it possible in an especially simple manner to display and optionally process the determined measured value or determined measured values depending on other values, for example comparison values or setpoints.

SUMMARY OF THE INVENTION

To achieve the object, the measurement means is characterized by at least one influencing input which acts on the sensor or on the measurement and evaluation circuit. The "influencing input" is one such connecting point of the electrical measurement means to which or via which the "influencing value" can be applied or input. The influencing input is a value with which the measured value or measured values can be influenced in the broadest sense. The influencing input, the sensor, and the measurement and evaluation circuit can be sensitive to electrical, optoelectronic, optical, pneumatic or hydraulic influencing values. When the electrical measurement means has several influencing inputs, the influencing inputs can be of different electrical sensitivity. Thus, at least one influencing input can be electrically sensitive, at least one influencing input can be optoelectronically or optically sensitive, and at least one influencing input can be pneumatically or hydraulically sensitive. The formulation "sensitive to electrical influencing values" or the formulation "sensitive to optoelectronic and/or optical influencing values" means that the influencing value can be present in electrical form or in optoelectronic or optical form.

Since the electrical measurement means, as explained above, includes an influencing input, to which or via which a influencing value can be applied or input, the electrical measurement means also includes an influencing value selector. That is, a component, device or means with which the influencing value to be used at the time is generated or selected. Preferably, this influencing value selector is external and separate from the remaining measurement means, and is connected to the remaining measurement means via an electrical line, via an optical line, or via a pressure line.

In alternative embodiments, the influencing value selector can be made differently, especially to work passively or actively.

If the influencing value selector is made to work passively in the electrical measurement means, the influencing value generated or selected by it must be interrogated or read out, proceeding from the influencing input of the measurement means. A passively working influencing value selector can provide a resistance, capacitance, or inductance value which represents the influencing value, to be interrogated or read out.

An actively operating influencing value selector can apply a voltage value to the influencing input of the electrical measurement means. The voltage value represents the influencing value or can impress a current value which represents the influencing value. It is also possible to use one such influencing value selector which delivers a pressure to the influencing input. The pressure represents the influencing value via a pressure line.

The electrical measurement means may include an influencing value selector made to work actively, and therefore require electrical energy. This electrical energy can be supplied independently to the influencing value selector from the remaining measurement means. The electrical energy required by the actively working influencing value selector can be supplied to it by the remaining measurement means. This is recommended because the influencing value selector must be connected to the remaining measurement means. It is further recommended that the influencing value be transmitted via the connecting line between the influencing value selector and the remaining measurement means. The electrical energy required by the influencing value selector must also be transmitted from the remaining measurement means to the influencing value selector. The connecting line can be a two-wire line because both information and energy can be transmitted via a two wire line.

Otherwise, the influencing input can preferably be made as a standardized analog input, for example for an influencing value from 0 V to 10 V, from 4 mA to 20 mA or from 0 mA to 20 mA. This has the advantage that a host of sensors available on the market can be used as the influencing value selector.

The influencing value selectors can also be especially "cheap sensors," that is those which do not have a measured value display or any mechanical adjustment elements.

In the subject measurement means, the actual sensor, here called the main sensor, and the influencing value selector, here called the secondary sensor, can preferably be made cylindrical and be provided with plug connections. This has advantages for connection and terminal engineering.

The subject electrical measurement means integrated sensor is preferably a so-called "intelligent" sensor, that is a sensor which can be programmed or parameterized. Then the important teaching of the invention—influencing input—easily enables programming and parameterization of the sensor with a corresponding influencing value via the influencing input.

In the embodiment of the electrical measurement means in which there is an influencing input acting on the sensor, the influencing value can be used not only to program or parameterize the sensor, but also to otherwise influence the sensor. In particular, the transmission characteristic of the sensor—dependency of the intermediate value generated by the sensor on the measured quantity—can be influenced. For example, if the transmission characteristic is not linear, it can be linearized. Further, an actually linear transmission characteristic can be influenced such that after influencing, it has a degressive or progressive characteristic. It is also possible to suppress from the transmission characteristic the initial range, or the end range, or both an initial range and also the end range, so that there is a transmission characteristic as in a high pass filter, lowpass filter, or a bandpass filter.

Especially when it is possible to act on the measurement and evaluation circuit via the influencing input provided in the electrical measurement means, there are further possibilities for achieving different results via different influencing values.

Difference pressure measurements and other control means are examples of the fact that determined measured values may depend on other values such as comparison values or set points. The difference necessary for this purpose can be determined by subtracting the value input as a constant quantity or by subtracting this value as a variable quantity, that is, as a quantity which varies over time, via the influencing input—as the influencing value. It is also possible to input a multiplying value or a dividing value as the influencing value via the influencing input. In this manner, a value may be input with which the intermediate value derived from the measured quantity is multiplied or divided. The measured value can thus be spread or compressed. An influencing value is also conceivable which leads to the measured value being inverted, therefore a value being delivered to the measured value display or a value being present on the measured value output to which the inverse of the measured value corresponds.

The subject electrical measurement means preferably includes at least one measured value output so that the measured value can be read out not only using the measured value display, but also so that the measured value is available via the measured value output in order to be displayed elsewhere and "to be used" in some other way, for example, in a mechanical device or means or in a process engineering system, such as in a control means of one such process engineering system.

The electrical measurement means is generally provided with several measured value outputs. Whether there are multiple measured value outputs or not, it is recommended that at least one measured value output be made to work analog and at least one measured value output be made to work digital, or at least one measured value output be made to work as a switching output. In the embodiment of the subject electrical measurement means, the measured value output is made as a switching output. The operating threshold can be input by a corresponding influencing value via the influencing input of the subject invention. Using a corresponding influencing value, via the influencing input, a certain hysteresis behavior can be impressed on the measured value output at a switching output. This hysteresis behavior can also be effective depending on the measured value. Otherwise, using a corresponding influencing value with a nonparallel displacement of the operating point hysteresis line can be accomplished so that the hysteresis becomes greater as the measured value increases, therefore a funnel-shaped characteristic results.

It has already been explained above that different influencing values can take effect via the influencing input in the electrical measurement means. These inputs provide for implementing quite different measures. This is addressed below.

In the subject electrical measurement means, there can be a single influencing input. Nevertheless, difference measures can be achieved with different influencing values, by influencing the sensor, by influencing the measurement and evaluation circuit, and by influencing the sensor and the measurement and evaluation circuit. To do this, a branching component can be connected downstream of the single influencing input. The branching component delivers influencing values below a certain influencing threshold only to the sensor, and influencing values above a certain influencing threshold only to the measurement and evaluation circuit. It is also possible to operate the sensor and the measurement and evaluation circuit in different fashions such that the sensor is sensitive only to influencing values below or only to influencing values above a certain influencing threshold, and the measurement and evaluation circuit is sensitive only to influencing values above a certain influencing threshold or only to influencing values below a certain influencing threshold. In addition, the sensor and the measurement and evaluation circuit can be influenced in a time-dependent fashion. In this version, then, the sensor resets to an influencing value only when this influencing value is below or above a time threshold. Likewise, the measurement and evaluation circuit responds to an influencing value only when it is above or below a time threshold.

Allowing different influencing values to take effect, whether on the sensor or on the measurement and evaluation circuit, can be accomplished by the subject electrical measurement means having several influencing inputs, such as at least one influencing input for the sensor and at least one influencing input for the measurement and evaluation circuit.

In the subject electrical measurement means, the influencing value or the influencing values can represent the same physical quantity as the measured quantity; this applies in difference pressure measurement or in conjunction with the control means in which a measured quantity or a measured value represents the present state, or where a reference variable is required. However, it is also possible to derive the influencing value or the influencing values from a physical quantity other than the measured quantity. For example, when a pressure is to be determined as the measured quantity, an influencing value can be formed as a function of temperature in order to implement temperature-dependent pressure compensation. An influencing value can also be implemented as a function of temperature, pressure or flow.

Finally, it should be point out that in the electrical measurement means, the measurement and evaluation circuit can also assume very complex functions. For example, in the measurement and evaluation circuit a Proportional Integral Derivative PID control algorithm can be implemented, so that at the measured value output, an analog manipulated variable for an analog operating actuator is available as the output signal, such as for an analog operating pressure value.

In particular, there are various possibilities for embodying and developing the electrical measurement means as claimed in the present invention. To do this, reference is made both to the claims dependent on claim 1 and also to the description of the preferred embodiment of the electrical measurement means according to the invention shown in the drawings.

BRIEF DESCRIPTION OF THE DRAWINGS

The sole FIGURE is a schematic diagram illustrating the electrical measurement means.

DETAILED DESCRIPTION OF THE INVENTION

The sole FIGURE shows schematically an electrical measurement means with a measurement input 1, an integrated sensor 2, a measurement and evaluation circuit 3, a measured value display 4, and several measured value outputs 5.

It is important for the electrical measurement means of the invention that there is an influencing input 6 which acts on the sensor 2 and on the measurement and evaluation circuit 3. The influencing input 6 is the connecting point for the electrical measurement means to which or via which the "influencing value" can be applied or input. Therefore, a value is applied with which the measured value or measured values can be influenced in the broadest sense. The influencing input 6 and the measurement and evaluation circuit 3 can be sensitive to electrical, optoelectronic, or optical influencing values.

As shown, the electrical measurement means also includes an influencing value selector 7, whereby a component, a device, or a means with which the influencing value to be used at the time is generated or selected. In this embodiment the influencing value selector 7 is external, therefore separate from the remaining measurement means, and is connected to the remaining measurement means via the connecting line 8. Via the connecting line 8 both the influencing value is transmitted from the influencing value selector 7 to the remaining measurement means and also the electrical energy required by the influencing value selector 7 is transmitted from the remaining measurement means to the influencing value selector 7. The connecting line 8 is a two-wire line via which, as is adequately known in the prior art, both information and also energy can be transmitted.

In this embodiment, the electrical measurement means in accordance with the invention is used in conjunction with a process engineering system 9 which includes a control means 10. Additionally, there is an evaluation, control and display means 11 which is separate from the actual measurement means.

In this embodiment the measured physical quantity is pressure. The pressure present in the process engineering system 9 is delivered to the measurement input 1 and to the control means 10. The pressure on the control means 10 is delivered to the measurement input 1. The lines to the sensor 2, proceeding from the system 9 and from the control means 10, are therefore pneumatic or hydraulic lines, and not electrical lines. The integrated sensor 2 is connected downstream of the measurement input 1. An intermediate value which has been generated by the integrated sensor 2 and which corresponds to the measured quantity is delivered to the measurement and evaluation circuit 3. An influencing value which is generated by the influencing value selector 7 and which is input via the connecting line 8 and the influencing input 6 is also delivered to the measurement and evaluation circuit 3. The measured value which is generated by the measurement and evaluation circuit 3 and which is dependent on the intermediate value generated by the sensor 2 and the influencing value input via the influencing input 6 is delivered to the measured value display 4 and to the measured value outputs 5. The measured value outputs 5 are made differently; one measured value output 5 works analog, one measured value output 5 works digital, and one measured value output 5 is made as the switching output.

It is indicated in FIG. 1 that, between the influencing value selector 7 and the evaluation, control and display means 11, information or date exchange is possible. Not only are measured values supplied from the measured value outputs 5 of the electrical measurement means to the evaluation, control and display means 11, but that the evaluation, control and display means 11 can also input information or data into the electrical measurement means as claimed in the invention and that the electrical measurement means of which is generated by the influencing value selector 7 and which is input via the connecting line 8 and the influencing input 6 is also delivered to the measurement and evaluation circuit 3. The measured value which is generated by the measurement and evaluation circuit 3 and which is dependent on the intermediate value generated by the sensor 2 and the influencing value input via the influencing input 6 is delivered to the measured value display 4 and to the measured value outputs 5. The measured value outputs 5 are made differently; one measured value output 5 works analog, one measured value output 5 works digital, and one measured value output 5 is made as the switching output.

It is indicated in FIG. 1 that, between the influencing value selector 7 and the evaluation, control and display means 11, information or data exchange is possible. Not only are measured values supplied from the measured value outputs 5 of the electrical measurement means to the evaluation, control and display means 11, but that the evaluation, control and display means 11 can also input information or data into the electrical measurement means as claimed in the invention and that the electrical measurement means of the invention can also feed information or data to the influencing value selector 7 and to the control means 10.

What is claimed is:

1. Electrical measurement means comprising:
   at least one measurement input;
   at least one integrated sensor;
   a measurement and evaluation circuit;
   at least one measured value display;
   at least one measured value output; and
   at least one influencing input which acts on one of the at least one sensor and the measurement and evaluation circuit;
   wherein the measurement means is adapted to supply electrical energy to an external influencing value selector for operation of the at least one influencing value selector, the influencing value selector being separate from the measurement means.

2. Electrical measurement means as claimed in claim 1, wherein the influencing input, the at least one sensor and the measurement and evaluation circuit are sensitive to electrical influencing values.

3. Electrical measurement means as claimed in claim 2, wherein the influencing input is a standardized analog input.

4. Electrical measurement means as claimed in claim 1, wherein the influencing input, the at least one sensor, and the measurement and evaluation circuit are sensitive to opto-electronic influencing values.

5. Electrical measurement means as claimed in claim 1, wherein the influencing input, at least one sensor, and the measurement and evaluation circuit are sensitive to optical influencing values.

6. Electrical measurement means as claimed in claim 1, wherein the influencing input, the at least one sensor, and the measurement and evaluation circuit are sensitive to opto-electronic and optical influencing values.

7. Electrical measurement means as claimed in claim 1, wherein the external influencing value selector is adapted to operate passively.

8. Electrical measurement means as claimed in claim 1, wherein the external influencing value selector is adapted to operate actively.

9. Electrical measurement means as claimed in claim 1, wherein the influencing value selector is connected via a connecting line to the measurement means, wherein the influencing value is transmitted from the influencing value selector to the measurement means via the connecting line and also the electrical energy from the measurement means to the influencing value selector is supplied via the connecting line.

10. Electrical measurement means as claimed in claim 1, wherein the at least one sensor is a programmable sensor which is parameterizable via the influencing input.

11. Electrical measurement means as claimed in claim 1, wherein the at least one sensor is programmable via the influencing input.

12. Electrical measurement means as claimed in claim 1, wherein the at least one sensor is parameterizable via the influencing input.

13. Electrical measurement means as claimed in claim 1, wherein the at least one measured value output comprises an analog output.

14. Electrical measurement means as claimed in claim 1, wherein the at least one measured value output comprises a digital output.

15. Electrical measurement means as claimed in claim 1, wherein the at least one measured value output comprises a switching output.

* * * * *